Jan. 29, 1924.

A. C. ROWLEY 1,482,259

ACCELERATOR FOR DRY PIPE VALVES

Filed April 26, 1923  3 Sheets-Sheet 1

Inventor-
Arthur C. Rowley.
by his Attorneys
Howson & Howson

Jan. 29, 1924.

A. C. ROWLEY 1,482,259

ACCELERATOR FOR DRY PIPE VALVES

Filed April 26, 1923    3 Sheets-Sheet 2

Inventor:-
Arthur C. Rowley
by his Attorneys
Howson & Howson

Patented Jan. 29, 1924.

1,482,259

UNITED STATES PATENT OFFICE.

ARTHUR C. ROWLEY, OF PHILADELPHIA, PENNSYLVANIA, ASSIGNOR TO GLOBE AUTOMATIC SPRINKLER COMPANY, OF PHILADELPHIA, PENNSYLVANIA, A CORPORATION OF PENNSYLVANIA.

ACCELERATOR FOR DRY-PIPE VALVES.

Application filed April 26, 1923. Serial No. 634,899.

*To all whom it may concern:*

Be it known that I, ARTHUR C. ROWLEY, a citizen of the United States, residing in Philadelphia, Pennsylvania, have invented an Accelerator for Dry-Pipe Valves, of which the following is a specification.

This invention relates to a device for hastening the operation of a dry pipe valve after the opening of one or more of the automatic sprinkler heads of a fire extinguishing system, and one object of said invention is to provide an accelerator of simplified and substantial construction, involving relatively few parts and having these so disposed as to permit of their being easily reset after the device has operated.

A further object of the invention is to provide an accelerator having its parts so designed and arranged that the likelihood of their sticking or refusing to operate under predetermined conditions is reduced to a minimum, and which shall therefore be thoroughly reliable under conditions of use.

I further desire to provide an accelerator which by reason of its simple and rugged construction shall require for its manufacture fewer parts and less labor than has hitherto been needed for similar devices of the same class.

These objects and other advantageous ends I attain as hereinafter set forth, reference being had to the accompanying drawings, in which, Fig. 1 is a side elevation of an accelerator constructed in accordance with my invention;

Figure 1:
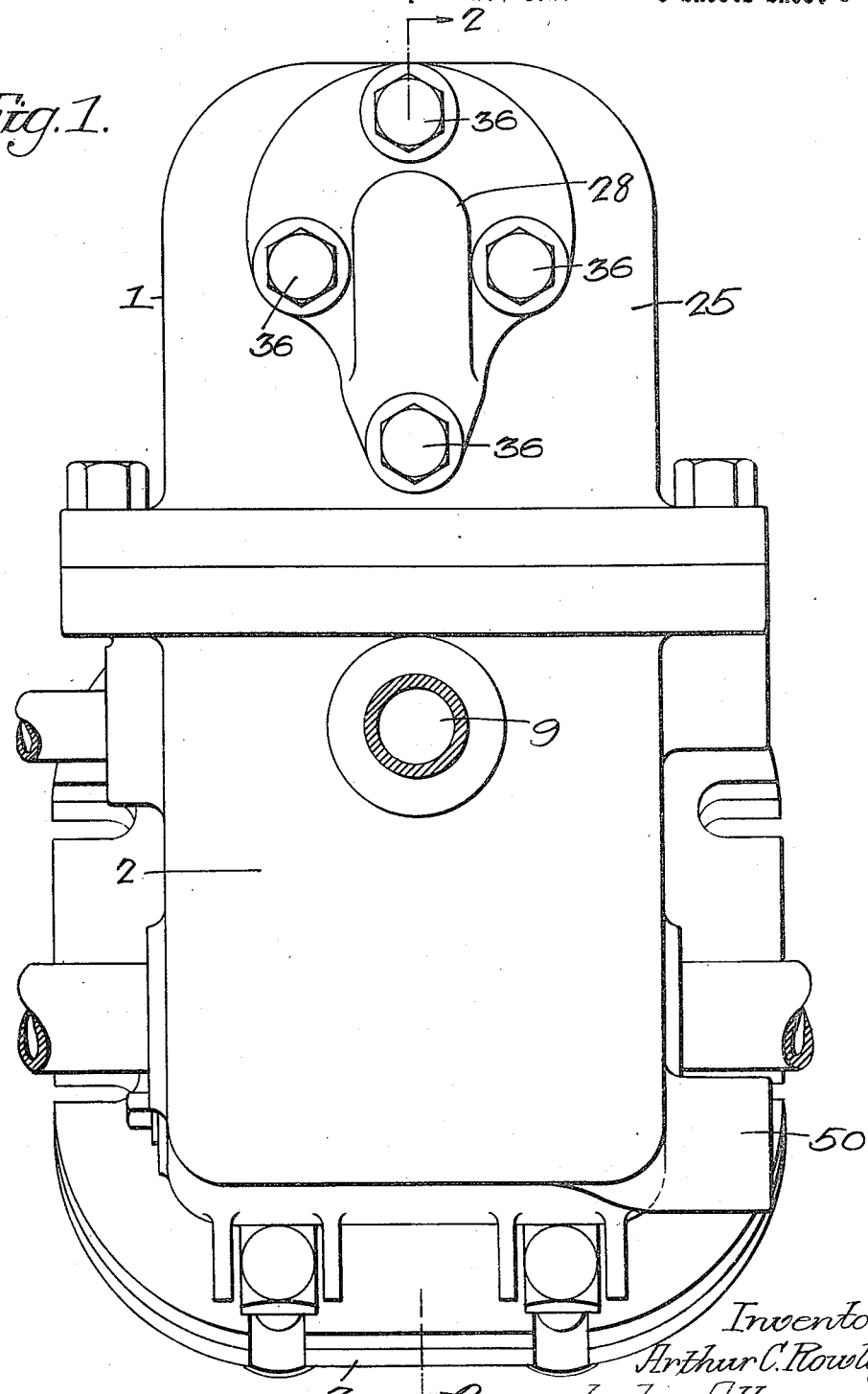
Figure 2:
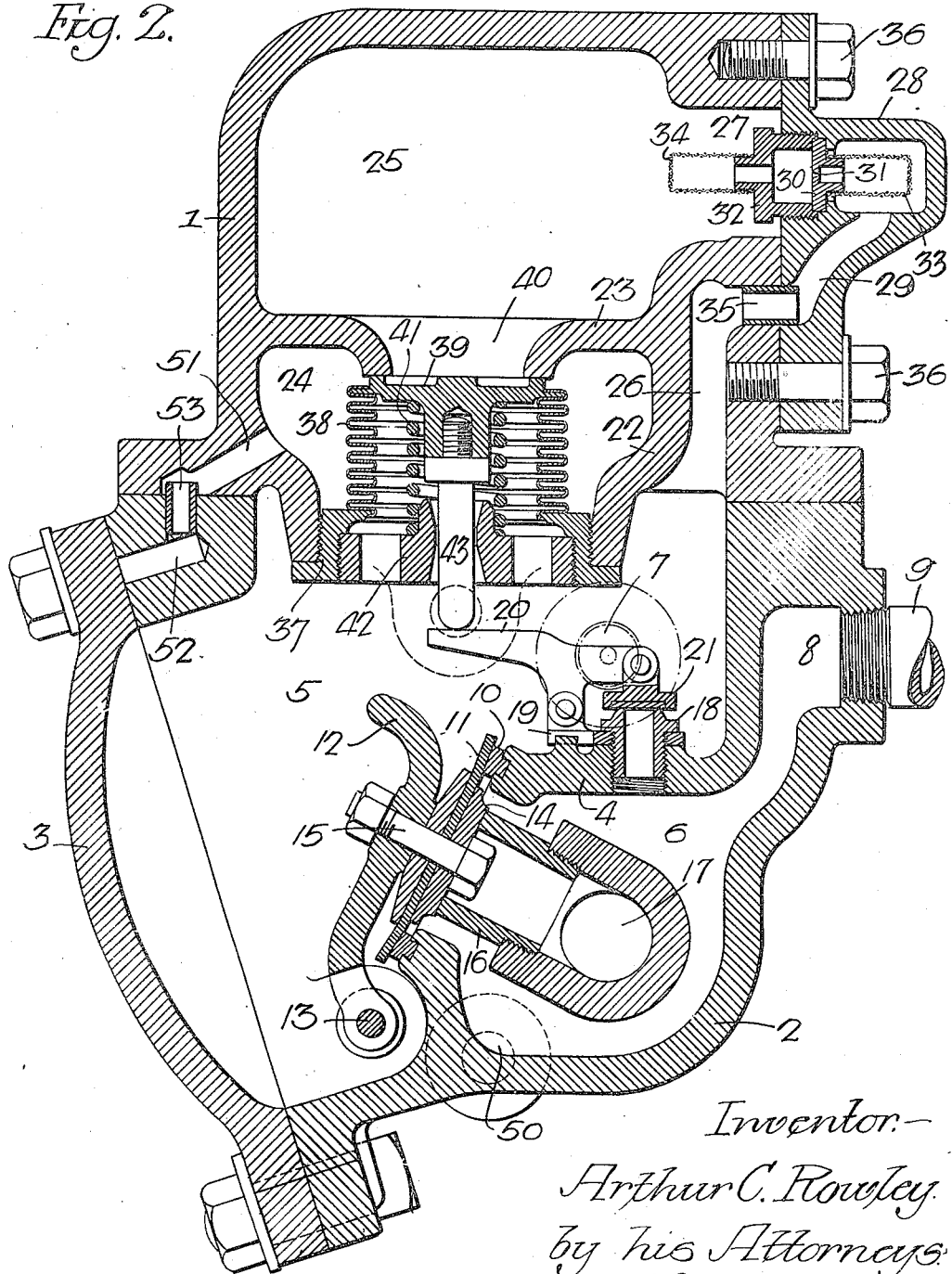
Fig. 2 is a vertical section on the line 2—2, Fig. 1.
Figure 3:
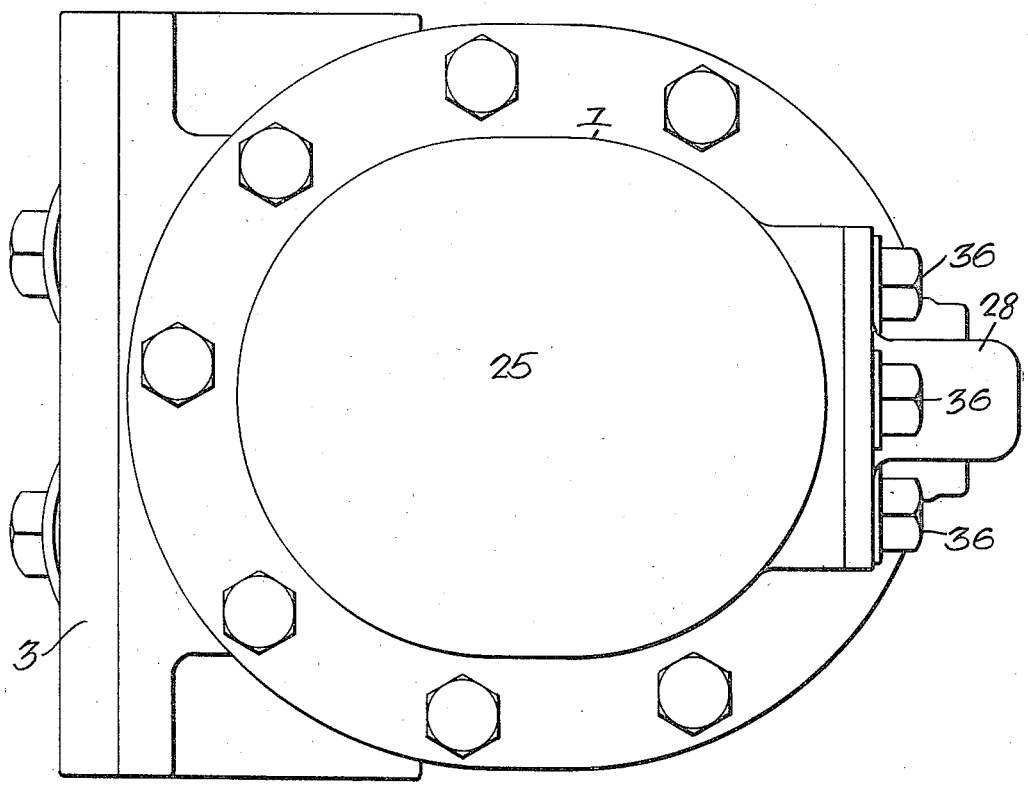
Fig. 3 is a plan of the accelerator.
Figure 4:
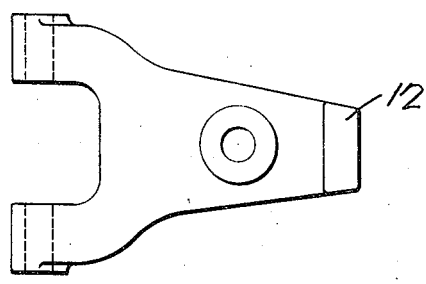
Fig. 4 is a plan of the arm for supporting one of the valves or clappers of the accelerator.

In accordance with my invention, I provide a casing having flanged upper and lower sections 1 and 2 bolted together, the lower section having a relatively large side opening normally closed by a cover 3. Said lower section is divided by a partition 4 into two chambers 5 and 6, of which the first is connected through an opening 7 with the riser or other air containing pipe of a fire extinguishing system. The second chamber 6 is connected through an opening 8 with a conduit 9 leading to the atmospheric or intermediate chamber of a dry pipe valve which may be either of the mechanical or differential type.

In the partition 4, I provide a relatively large opening having a valve seat 10 designed to be normally closed by a valve 11 fixed to an arm 12 pivotally mounted on a spindle 13 in the chamber 5. That portion of the valve 11 designed to cooperate with the seat 6 is preferably made in the form of a sheet or plate of more or less flexible material such as rubber and said valve in addition to this plate includes a disc 14 concentric therewith held to the arm 12 by a bolt 15. This disc is designed to cooperate with the circular end of a conduit 16 extending through the chamber 6 and connected through an opening 17 with the riser of the fire extinguishing system. The circular end of the conduit 16 is preferably substantially concentric with the valve seat 10 and the arrangement is such that when it is engaged by the disc 14, the flexible valve 11 likewise engages said seat 10, making a tight joint therewith by reason of its flexibility.

The partition 4, in addition to the valve seat 10, is formed with a second opening in which is mounted a relatively small valve seat in the form of a bushing 18. The latter is preferably flanged and is designed to confine between its flange and the adjacent portion of the partition, a bracket 19 on which is fulcrumed a lever 20 pivotally connected to a valve 21 so mounted as to cooperate with the seat 18.

The section 1 of the casing is formed with two partitions 22 and 23 dividing it into chambers 24 and 25, the latter of which opens on the side of the section 1 of the casing. The partition 22 extends between the chamber 24 and the chamber 5 of the section 2 and there is formed in the section 1 a passage 26 opening into the chamber 5 and likewise opening on the side of the casing section 1 in the same plane as the opening 27 from the chamber 25. For connecting the opening 27 with the passage 26, I removably bolt or otherwise connect to the side of the casing section 1 a cover plate 28 in which is formed a passage 29, and in this passage I mount a plate 30 having a relatively small or restricted orifice 31 therethrough. This plate 30 is held in position by a sleeve 32 threaded into the cover 28 and opening into the chamber 25.

The plate 30 as well as the sleeve 32 respectively carries cylindrical or other suitable form of screens 33 and 34, in order to effectually prevent stoppage of the restricted opening 31. In order to insure registry of the ends of the passages 26 and 29, I mount in the former a sleeve 35 which projects beyond the side face of the casing section 1 and necessarily extends into the passage 29 before the bolts 36 can be set up to hold the cover 28 in place.

The two partitions 22 and 23 have coaxial openings therethrough in one of which is threaded a ring 37 carrying a collapsible or flexible diaphragm element in the form of a Sylphon bellows 38. This at its upper end carries a plate 39 having feet capable of engaging the edge of the opening 40 through the partitions 33 and held against said partition by a coil spring 41 carried by a guiding retainer 42 threaded into the ring 37. Said plate has connected to its under face a stem 43 which projects through a central opening in the guiding retainer 42 into engagement with an arm of the lever 20 and the arrangement is such that movement of the plate 39 away from the partition turns said lever on its fulcrum and unseats the valve 21.

With the above described arrangement of parts, if the openings 7 and 17 be connected to the riser or air containing portion of a fire extinguishing system and if the conduit 9 be connected to the atmospheric or intermediate chamber of a dry pipe valve forming part of said system, it will be appreciated that the pressure in the chamber 6 will be that of the atmosphere, whenever the valves 21 and 11—14 are closed. At the same time the pressure in the chambers 5, 24 and 25 will be the same as that existing in the riser, since although the spring 41 holds the valve 39 closed, the air entering the opening 7 will flow through the passages 26 and 29 and through the restricted opening 31 into the chamber 25 and around the feet of plate 39 into the chamber 24. The valve 11 will of course remain seated since the pressure in the chamber 5, while equal to that in the conduit 16, is less than that in the chamber 6.

If now there is a relatively sudden reduction of the air pressure in the sprinkler system such as would be caused by the opening of a sprinkler head, there is at once a corresponding reduction of the air pressure in the chamber 5. Since however it is not possible for the air under pressure in the chambers 24 and 25 to quickly escape owing to the presence of the plate 30 with its restricted orifice 31, said air acts upon the plate 39 and moves it away from the partition 23 against the action of the spring 41,—the diaphragm 38 collapsing or contracting to permit of this movement. As a result, the stem 43 acts on the lever 20 and unseats the valve 21, thus permitting the escape of the air from the chamber 5 into the atmospheric chamber 6. The valve 11—14 is so designed that this reduction of pressure in the chamber 5 is sufficient to permit said valve being unseated by the action of the air under pressure in the conduit 16, so that the air is free to pass from the riser through the conduit 16 into the chamber 5 and thence into the chamber 6 from which it flows through the conduit 9 to the intermediate chamber of the dry pipe valve where it, in one form of valve, escapes to the atmosphere and thus materially hastens the reduction of the air pressure in the riser and the opening of the dry pipe valve.

In other cases, the air delivered as described through the conduit 9, directly acts on the air clapper of the dry pipe valve to unseat this, as before reducing the time elapsing between the opening of a sprinkler head and the operation of the dry pipe valve whereby water is supplied to the system.

In order to restore the device to a condition ready for another operation, any water entering the chamber 6 is drawn off through an opening 50 leading therefrom, after which the removal of the cover plate 3 will permit the valve 11—14 to be re-seated by hand. Inasmuch as the spring 41 will seat the plate 39 on the partition 23 when the pressures are the same in the two chambers 5 and 25, the valve 21 is so made as to automatically engage its seat as soon as this is permitted by the upward movement of the valve stem 43. In order to insure the removal of any water which might enter the chambers 24 and 25, I provide a passage 51 leading therefrom and opening upon the lower face of the flange of the casing section 1. In the casing section 2, I provide a second passage 52 one of whose ends is normally closed by the cover plate 3 and whose opposite end, through a sleeve 53, opens upon the upper face of the flange of said casing section 2. Said sleeve is so mounted as to project into the passage 51 and insure its communication with the passage 50 when the sections of the casing are bolted together. As a consequence of this arrangement, removal of the cover plate 3 opens the passage 52 and permits the escape therethrough of any water which may have collected in the chamber 24.

From the above description, it will be appreciated that my accelerator is of relatively simple construction and has its parts so constructed and arranged that the likelihood of their failure to operate from any cause is reduced to a minimum. The arrangement moreover is such that in a relatively short time after the occurrence of a sudden reduction of pressure in the riser, the latter is placed in direct communication with the atmospheric chamber of the dry pipe valve with which the device is associated. The mounting of the parts is such that they may be reset with the utmost ease and dispatch after operation and the design is such that the device may be manufactured with the expenditure of a minimum of material and labor.

The certainty of operation is insured by the inclusion of the relay valve 21 which provides for the quick reduction of the pressure in the chamber 5 after said pressure has begun to fall, insuring the opening of the main valve 11—14 and the quick flow of air from the riser to the intermediate chamber of the dry pipe valve.

I claim:

1. The combination in an accelerator for a dry pipe valve of a casing having two chambers respectively for connection with the air containing portion of a fire extinguishing system and with the intermediate chamber of a dry pipe valve; main and relay valves normally cutting off communication between said chambers; and a pressure controlled diaphragm connected to cause opening of the relay valve when the pressure is suddenly reduced in said fire extinguishing system.

2. The combination in an accelerator for a dry pipe valve of a casing having two chambers respectively for connection with the air containing portion of a fire extinguishing system and with the intermediate chamber of a dry pipe valve; main and relay valves normally cutting off communication between said chambers; a chamber including a movable wall and having a restricted inlet connected to receive air from said fire extinguishing system; with means for operatively connecting said movable wall to the relay valve.

3. The combination of a casing having three chambers of which two are connected through a passage having a relatively restricted portion; a movable wall between said chambers; means for yieldingly holding said wall in a definite position; main and a relay valve normally closing openings between one of said chambers and the third chamber; with means for connecting the wall between the first and second chambers with the relay valve to cause opening of the latter when said wall moves.

4. The combination in an accelerator for a dry pipe valve of three chambers of which the first and second are connected by a relatively restricted passage; conduits from the air containing portion of a fire extinguishing system opening respectively into the second and third chambers; the third chamber having an outlet for connection with the intermediate chamber of a dry pipe valve; with a valve normally closing the conduit connecting the third chamber to the fire extinguishing system and also formed to cut off communication between the second and third chambers; with means controlled by the expansion of air in the first chamber for causing opening of said valve when the air pressure in the second chamber is suddenly reduced.

5. The combination in an accelerator for a dry pipe valve of a casing having two chambers; a valve normally closing an opening between said chambers; a conduit leading from the air containing portion of a fire extinguishing system and also closed by said valve when it is in its closed position; a second valve controlling the flow of air between said two chambers; with means for causing the opening of said second valve when a sudden reduction of pressure occurs in one of said chambers.

6. The combination in an accelerator for a dry pipe valve of a casing having three chambers and providing a restricted passage between the first and second of said chambers; conduits connected to a source of air under pressure and entering the second and third chambers; a main valve normally closing an opening between the second and third chamber and at the same time closing the conduit entering the third chamber; a second valve controlling the flow of air from the second to the third chambers; and means actuated by the expansion of air in the first chamber when a sudden reduction from pressure occurs in the second chamber, for opening said second valve.

7. The combination in an accelerator for a dry pipe valve of a casing having three chambers and providing a restricted passage between the first and second of said chambers; conduits connected to a source of air under pressure and entering the second and third chambers; a main valve normally closing an opening between the second and third chambers and at the same time closing the conduit entering the third chamber; a second valve controlling the flow of air from the second to the third chambers; and means actuated by the expansion of air in the first chamber when a sudden reduction from pressure occurs in the second chamber for opening said second valve said means including a member movably mounted between the first and second chambers and mechanically connected to the second valve.

8. The combination in an accelerator for a dry pipe valve of a casing having three chambers of which the first and second are connected by a restricted passage; an element movably mounted between the first and second chambers and yieldingly maintained in a definite position; two valves normally closing openings between the second and third chambers; a conduit opening into the third chamber and also normally closed by one of said latter valves; with means for causing the other of said latter valves to be opened when the movable element is actuated.

9. The combination in an accelerator for a dry pipe valve of a casing having a plurality of chambers of which one is connected to the intermediate chamber of the dry pipe valve; a conduit leading from the air containing portion of a fire extinguishing system; a valve normally cutting off communication between two of the chambers of the casing and also closing said conduit; with means independent of said valve for causing opening of the same when a sudden reduction of pressure occurs in the casing.

10. The combination in an accelerator for a dry pipe valve of a casing having at least two chambers of which one is connected to the intermediate chamber of a dry pipe valve; a conduit connected to the air containing portion of a fire extinguishing system and positioned to deliver air therefrom to said latter chamber of the casing; a valve normally preventing communication between said chambers and also normally closing said conduit; with means for causing such a reduction of pressure as will cause unseating of said valve when a sudden reduction of pressure occurs in one of said chambers.

11. The combination in an accelerator for a dry pipe valve of a chamber and a conduit both connected to a source of air under pressure; a second chamber at atmospheric pressure; a valve normally held seated by pressure in the first chamber to close the conduit and cut off communication between said chambers; with means for exhausting air from the first chamber to permit unseating of said valve when a sudden reduction of pressure occurs in said first chamber.

12. The combination in an accelerator for a dry pipe valve of a chamber and a conduit both connected to a source of air under pressure; a second chamber at atmospheric pressure; a valve normally held seated by pressure in the first chamber to close the conduit and cut off communication between said chambers; with means for exhausting air from the first chamber to permit unseating of said valve when a sudden reduction of pressure occurs in said first chamber, the same comprising a valve for establishing communication between the first and second chambers and pressure responsive means for actuating said valve.

ARTHUR C. ROWLEY.